United States Patent
Zhu

(10) Patent No.: US 11,003,183 B2
(45) Date of Patent: May 11, 2021

(54) DRIVING SCENE BASED PATH PLANNING FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 229 days.

(21) Appl. No.: 15/703,882

(22) Filed: Sep. 13, 2017

(65) Prior Publication Data
US 2019/0079514 A1    Mar. 14, 2019

(51) Int. Cl.
| | |
|---|---|
| *G05D 1/00* | (2006.01) |
| *G06K 9/00* | (2006.01) |
| *G05D 1/02* | (2020.01) |
| *B60W 30/00* | (2006.01) |
| *G08G 1/00* | (2006.01) |
| *G01C 21/00* | (2006.01) |
| *G06K 9/62* | (2006.01) |

(52) U.S. Cl.
CPC ........... *G05D 1/0088* (2013.01); *B60W 30/00* (2013.01); *G01C 21/00* (2013.01); *G05D 1/0214* (2013.01); *G06K 9/00791* (2013.01); *G06K 9/6215* (2013.01); *G08G 1/00* (2013.01); *B60T 2201/089* (2013.01); *G05D 2201/0213* (2013.01)

(58) Field of Classification Search
CPC ...... G01C 21/005; G01C 21/26; G01C 21/30; G01C 21/34; G01C 21/3415; G01C 21/343; G01C 21/3446; G01C 21/3453; G01C 21/3461; G01C 21/3484; G01C 21/3492; G01C 21/3691; G01C 21/3694; G05D 1/008; B60W 2050/00898; B60W 2530/14
See application file for complete search history.

(56) References Cited

U.S. PATENT DOCUMENTS

| | | | | |
|---|---|---|---|---|
| 9,008,858 | B1* | 4/2015 | Payne | B60G 17/0195 |
| | | | | 701/1 |
| 9,927,251 | B2* | 3/2018 | Vu | G01C 21/3461 |
| 2009/0070035 | A1* | 3/2009 | Van Buer | G01C 21/32 |
| | | | | 701/450 |
| 2009/0138497 | A1* | 5/2009 | Zavoli | G01C 21/32 |
| 2009/0300067 | A1* | 12/2009 | Denaro | B60W 40/076 |

(Continued)

Primary Examiner — Thomas G Black
Assistant Examiner — Sara J Lewandroski
(74) Attorney, Agent, or Firm — Womble Bond Dickinson (US) LLP

(57) ABSTRACT

According to one aspect, a set of driving scenes are defined including, but are not limited to, a driving straight scene, a turning scene, a nudge scene, and a lane changing scene. For each of the predefined driving scenes, a list of path segments corresponding to a set of one or more features (e.g., speed, curvature, turning radius, relative distance, lane width, etc.) are determined based on the driving statistics of a number of vehicles driving through the same or similar driving scenes (e.g., driving straight, making turns, changing lanes, nudging obstacles or another vehicle) in the past. The path segments are then stored in a driving scene-to-path (scene/path) data structure specifically configured for the corresponding driving scene. For example, there will be at least one scene/path data structure for each of the driving straight scene, turning scene, nudge scene, and lane changing scene.

19 Claims, 12 Drawing Sheets

(56) References Cited

U.S. PATENT DOCUMENTS

| | | | |
|---|---|---|---|
| 2014/0095072 A1* | 4/2014 | Raab | G01C 21/26 |
| | | | 701/537 |
| 2014/0278052 A1* | 9/2014 | Slavin | G08G 1/0129 |
| | | | 701/400 |
| 2015/0142484 A1* | 5/2015 | Huang | G06Q 10/063 |
| | | | 705/7.11 |
| 2017/0320495 A1* | 11/2017 | Lu | B60W 50/14 |
| 2018/0024565 A1* | 1/2018 | Fridman | G01C 21/3822 |
| | | | 701/26 |
| 2018/0051997 A1* | 2/2018 | Grochocki, Jr. | G01C 21/3415 |
| 2018/0143643 A1* | 5/2018 | Fairfield | G01C 21/20 |
| 2018/0216949 A1* | 8/2018 | Kluge | G08G 1/096816 |
| 2018/0374032 A1* | 12/2018 | Pan | G01C 21/3461 |
| 2019/0025837 A1* | 1/2019 | Conor | G05D 1/0278 |
| 2019/0049256 A1* | 2/2019 | Camp | G01C 21/3453 |

* cited by examiner

| Turning Scene/Path Table 400 | | | | |
|---|---|---|---|---|
| Speed 401 | Source Lane Width 402 | Target Lane Width 403 | Turning Radius/ Curvature 404 | Path Segment 405 |
| Speed 1 | ... | ... | ... | Path segment 1 |
| Speed 2 | ... | ... | ... | Path segment 2 |
| Speed 3 | ... | ... | ... | Path segment 3 |
| ... | ... | ... | ... | ... |

FIG. 4A

| Speed 421 | Distance 422 | Object Type 423 | Lane Width 424 | Position Within Lane 425 | Path Segment 426 |
|---|---|---|---|---|---|
| Speed 1 | ... | ... | ... | ... | Path segment 1 |
| Speed 2 | ... | ... | ... | ... | Path segment 2 |
| Speed 3 | ... | ... | ... | ... | Path segment 3 |
| ... | ... | ... | ... | ... | ... |

Nudge Scene/Path Table 420

FIG. 4B

Lane Changing Scene/Path Table
450

| Speed 451 | Lane Changing Distance 452 | Source Lane Width 453 | Target Lane Width 454 | Path Segment 455 |
|---|---|---|---|---|
| Speed 1 | ... | ... | ... | Path segment 1 |
| Speed 2 | ... | ... | ... | Path segment 2 |
| Speed 3 | ... | ... | ... | Path segment 3 |
| ... | ... | ... | ... | ... |

FIG. 4C

Stop/Parking Scene/Path Table 470

| Speed 471 | Lane Width 452 | Stop/Parking Area Size 453 | Path Segment 454 |
|---|---|---|---|
| Speed 1 | ... | ... | Path segment 1 |
| Speed 2 | ... | ... | Path segment 2 |
| Speed 3 | ... | ... | Path segment 3 |
| ... | ... | ... | ... |

FIG. 4D

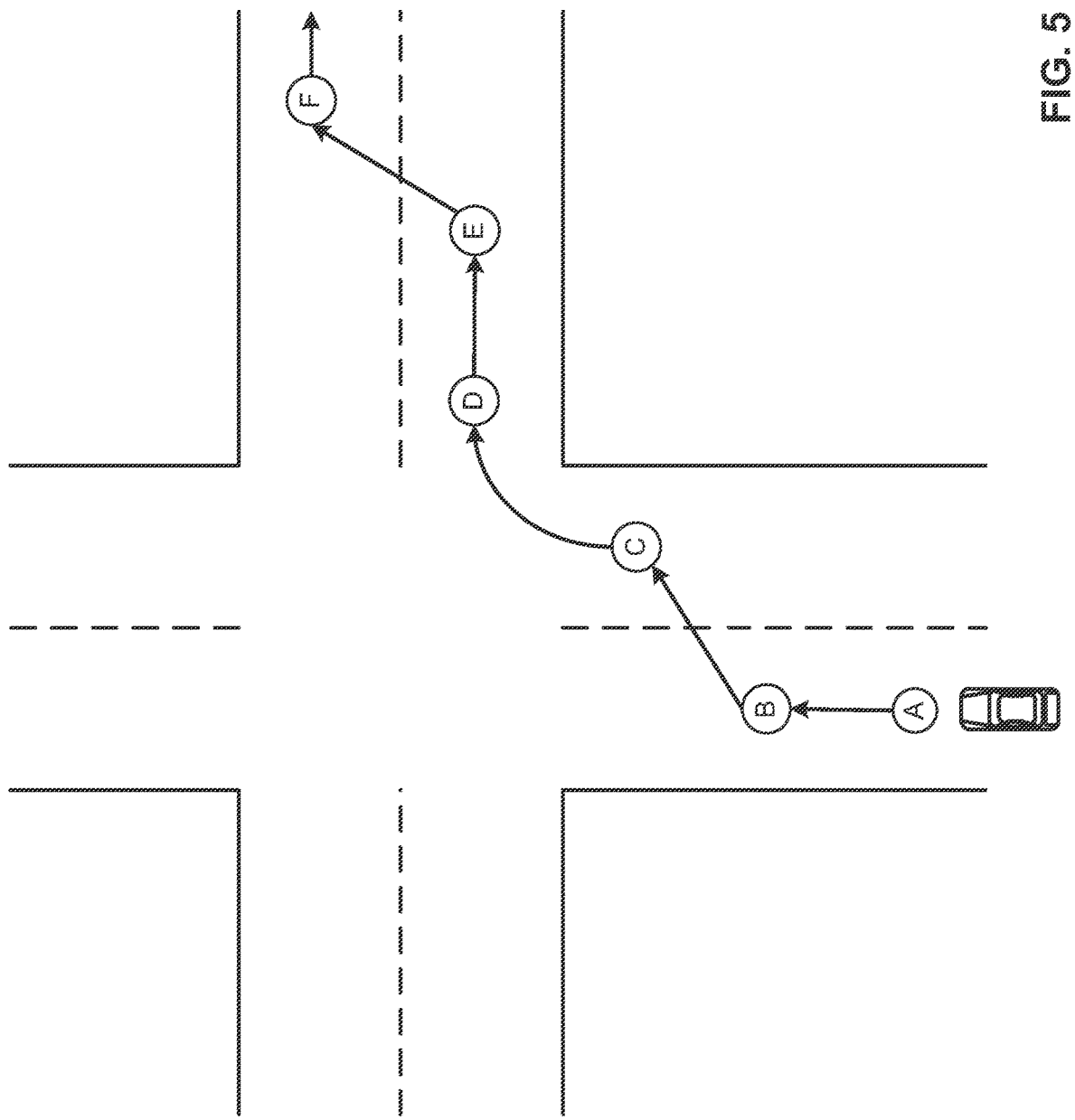

DRIVING SCENE BASED PATH PLANNING FOR AUTONOMOUS DRIVING VEHICLES

TECHNICAL FIELD

Embodiments of the present disclosure relate generally to operating autonomous vehicles. More particularly, embodiments of the disclosure relate to driving scene based path planning for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In planning a route from a starting location to a destination location, a reference line of the route is important as it is the ultimate goal for a path along which an autonomous driving vehicle is driven. However, a good path guideline could make a much difference compared to an ordinary reference line centered on the road. A typical reference line is determined based on the center line of a particular lane or road, which is obtained from the standard route and map information. However, such a reference line may not be the most optimal reference line. In addition, calculating a path based on a reference line is time consuming at real-time.

BRIEF DESCRIPTION OF THE DRAWINGS

Embodiments of the disclosure are illustrated by way of example and not limitation in the figures of the accompanying drawings in which like references indicate similar elements.

FIGS. 4A-4D are block diagrams illustrating data structures for mapping locations to preferred path segments under certain driving scenes according to certain embodiments.

FIG. 5 is a block diagram illustrating an example of road and lane configuration which may be utilized with an embodiment.

DETAILED DESCRIPTION

Figure 1:
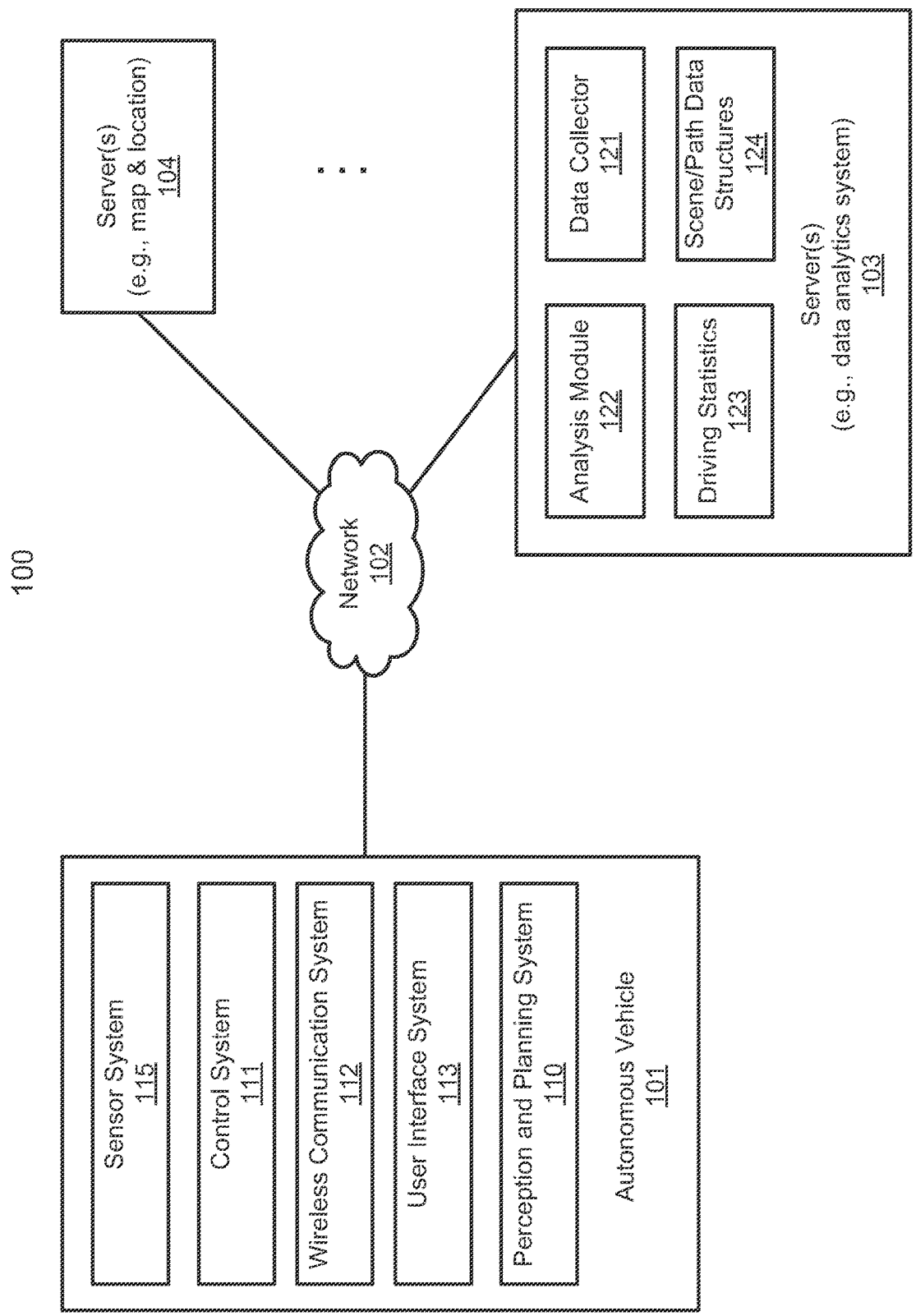
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a scene-based driving guideline is utilized to guide the path planning of an autonomous driving vehicle (ADV). The scene-based driving guideline represents a reference line of a lane of a road, which is determined based on scene-based preconfigured path segments. A scene based path segment is determined based on driving behaviors of a variety of drivers driving a variety of vehicles in the past under the same or similar driving circumstance (e.g., similar speed, curvature, lane configuration, direction), either manually or autonomously. A scene based reference line may not match the ordinary center-lined reference line. Rather, according to one embodiment, the scene-based reference line is determine based on an averaged driver of a large amount of drivers' behaviors under the same or similar driving circumstances, i.e., a driving scene. Such scene-based reference line represents the most optimal reference line that leads to the most comfortable and safe driving of the vehicles amongst most drivers.

According to one aspect, a set of driving scenes are defined including, but are not limited to, a driving straight scene, a turning scene (e.g., left turn, right turn, or U-turn), a nudge scene, a stop and/or parking (stop/parking) scene, and a lane changing scene (e.g., left or right lane changing). For each of the predefined driving scenes, a list of path segments corresponding to a set of one or more features (e.g., speed, curvature, turning radius, relative distance, lane width, etc.) are determined based on the driving statistics of a number of vehicles driven by a variety of drivers through the same or similar driving scenes (e.g., driving straight, making turns, changing lanes, nudging obstacles or another vehicle) in the past. The path segments are then stored in a driving scene-to-path (scene/path) data structure (e.g., databases, tables) specifically configured for the corresponding driving scene. For example, there will be at least one scene/path data structure for each of the driving straight scene, turning scene, nudge scene, stop/parking scene, and lane changing scene.

In one embodiment, a scene/path data structure includes a number of mapping entries. Each mapping entry maps a particular set of one or more features to a path segment that a majority of drivers would have driven through a scene having the same or similar features. The path segment represents a preferred or recommended path segment for a specific set of features of a specific driving scene. These scene/path data structures may be created offline based on the past driving statistics of many drivers driving many different types of vehicles at different points in time. These scene/path data structures can then be uploaded onto the autonomous driving vehicles and utilized subsequently for generating a path under the similar driving scenes without having to dynamically calculating the same path segments at real time. As a result, the path planning can be performed more efficiently.

According to another aspect, in response to a route for routing an autonomous driving vehicle from a source location to a target location, the route is analyzed to identify certain portions having characteristics resembling one of the predefined driving scenes. The route is segmented into a number of route segments based on a set of predefined driving scenes. For each of the route segments matching one of the predefined scenes, a first set of one or more features is extracted from the route segment. The first set of features can include a speed of the vehicle, a curvature of the route segment, a lane width, a direction of lane changing or turning, or a turning radius, etc. A search is conducted in a driving scene to path (scene/path) data structure associated with the matching driving scene based on the first set of features to identifying a preconfigured path segment, where the preconfigured path segment includes or is associated with a second set of features matching the first set of features. A path is then generated based on the route segments, where the path includes a number of path segments corresponding to the route segments. At least one of the path segments of the path is determined based on a preconfigured path segment corresponding to one of the predefined driving scenes.

In generating the path, in one embodiment, for each of the route segments matching one of the predefined driving scenes, a preconfigured path segment is identified based on the matching driving scene. A corresponding path segment of the path is replaced by the corresponding preconfigured path segment without having to dynamically calculating the same path segment. For those route segments whose features do not match with any of the features associated with the preconfigured path segments of the same or similar driving scenes, the path segments for the unmatched route segments are dynamically calculated, for example, based on the standard reference line obtained from the corresponding route segments.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
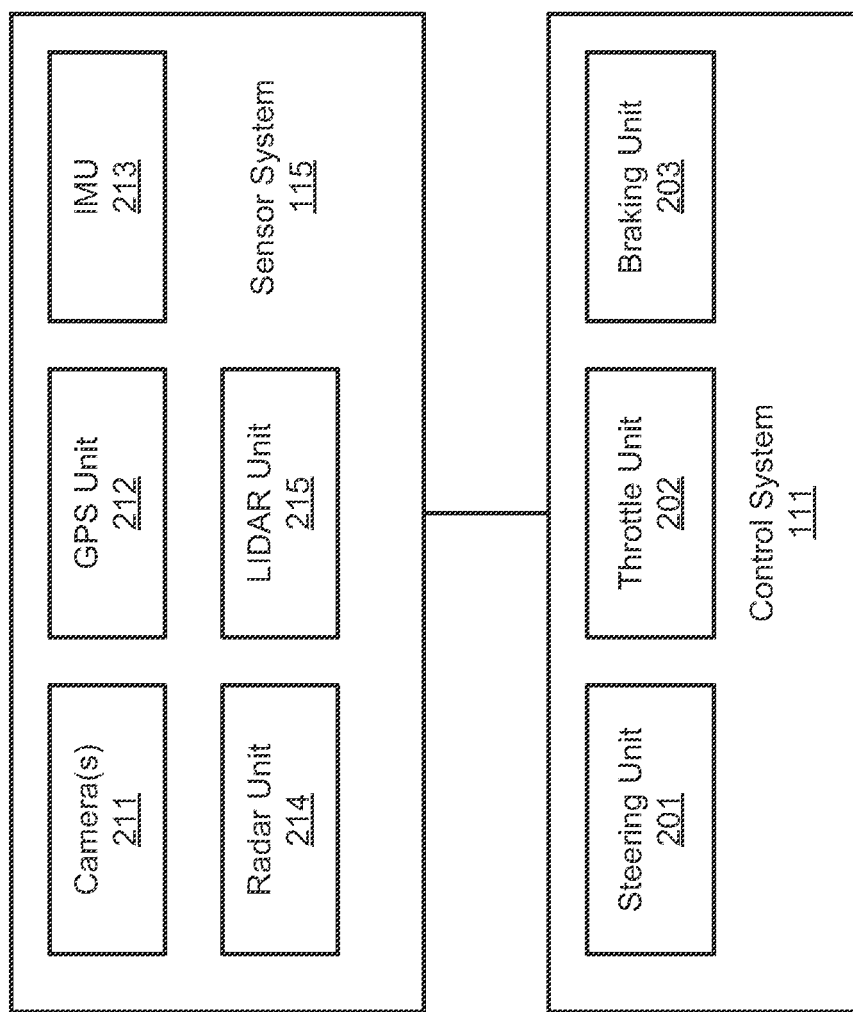
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and data analysis module 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, analysis module 122, which may be implemented as a part of a machine-learning engine or module, analyzes driving statistics 123 and generates a scene/path data structures 124. Data structures 124 can be implemented in a variety of formats such as tables, databases, or predictive models, etc. For the purpose of illustration, a table is utilized as an example of a data structure throughout this application. In one embodiment, each of scene/path tables 124 is associated with one of a set of predefined driving scenes, such as, for example, a driving straight scene, a turning scene, a nudging scene, a stop/parking scene, and a lane changing scene. A turning scene may further include a left-turning scene, a right-turning scene, and a U-turning scene. A lane changing scene may further include a left lane changing scene and a right lane changing scene. A driving scene is also referred to as a driving intention, which represents an intention to drive a vehicle in a particular way such as driving straight, making a turn, or changing lane, etc.

For each of the predefined driving scenes, analysis module 122 determines a list of path segments corresponding to different sets of one or more features determined based on the driving statistics 123 of a number of vehicles driving through the same or similar driving circumstances in the past. The path segments are then stored in a driving scene/path data structure specifically configured for the corresponding driving scene. For example, there will be at least one scene/path data structure in scene/path tables 124 for each of a driving straight scene, a turning scene, a nudging scene, a lane changing scene, or a stop or parking scene. In one embodiment, scene/path tables 124 include at least a straight scene/path table (optional), a left-turn scene/path table, a right-turn scene/path table, a U-turn scene/path table, a nudging scene/path table, a left lane changing scene/path table, a right lane changing scene/path table, and a stop/parking scene/path table.

In one embodiment, a scene/path table includes a number of mapping entries. Each mapping entry maps a particular set of one or more features of a particular driving scene to a path segment that a majority of drivers would have driven through with a driving environment represented the same or similar features. The path segment represents a preferred or recommended path segment for a specific set of one or more features associated with a specific driving scene. These scene/path tables may be created by analysis module 122 based on the past driving statistics 123 of many drivers driving many different types of vehicles at different points in time. Note that for a given set of one or more features, there may be more than one driving scenes. For example, from a given set of features, some vehicles can move straight, make a turn, nudge, change lane, or stop or park. Thus, there may be multiple scene/path tables that include an entry corresponding to the same features. However, their path segments would be different because they are associated with different driving scenes or driver intentions, which may be different at different points in time.

In one embodiment, for a given set of features of a given driving scene, the drivers' behaviors of all drivers are determined based on the corresponding driving statistics data obtained from driving statistics 123. For example, for a first set of features of a left-turn driving scene, all of the driving behaviors of drivers who made the left turn under the same or similar circumstances represented by the same or similar features (e.g., speed, curvature, turning radius, lane width) are identified from driving statistics 123. Different path segments of different drivers who made the left turn under the same or similar circumstances are analyzed to develop a preferred path segment (also referred to as a recommended or most optimal path segment) that summaries all of the driving behaviors of the drivers. For example, a preferred path segment can be determined by taking an average of different path segments performed by different drivers under the same or similar driving circumstances.

The preferred path segment is then stored in an entry of the corresponding driving scene/path table (e.g., the left-turn scene/path table) associated with the corresponding features. Thus, a preferred path segment of a particular location under a particular driving scene is determined based on driver behaviors of many drivers under the same or similar circumstances (e.g., speed, curvature, turning radius, lane width) of the same or similar driving scene in the history, which represents the path segment preferred by most of the drivers. A path refers to a number of path points (also referred to as control points) connected in series or sequence that connect a starting point to an ending point. Each path point is described via metadata indicating certain driving parameters such as a location, a speed, and a moving direction, etc. at the point in time of the path point.

A straight scene is the most simple and straight forward situation, which is related to a relatively straight path segment connecting a starting point and an ending point. Any path segment with a curvature less than a predetermined threshold, such as 0.005 radians, can be considered as a straight scene. Since the straight scene is relatively simple by connecting two points, it can be scaled to different lengths of path segments.

FIG. 4A shows an example of a turning scene/path table for a turning scene according to one embodiment. A turn scene refers to a driving scene in which a vehicle is turning from a source lane to a target lane, where directions of the source lane and the target lane are significantly different (e.g., greater than a predetermined threshold). Turning scene/path table 400 can represent a left-turn scene/path table, a right-turn scene/path table, or a U-turn scene/path table. Referring to FIG. 4A, turning scene/path table 400 includes a number of entries. Each entry maps a set of one or more of features 401-404 to a preferred path segment 405. The features include speed of the ADV 401, source lane width 402, target lane width 403, and/or turning radius or curvature 404. Any one or more of features 401-404 can be utilized for indexing or matching for the purpose of searching and locating an entry that matches a particular set of features of a route segment. For example, speed 401 and curvature 404 may be utilized as a primary searching index or searching features, while source lane width 402 and/or target lane width 403 may be utilized as a secondary searching index or searching features.

FIG. 4B shows an example of a nudge scene/path table according to one embodiment. A nudge scene refers to a driving scene in which a vehicle attempts to nudge or pass over an object (e.g., an obstacle, another vehicle). A nudge scene can include a left nudge scene (e.g., nudging on the left side of an object) and a right nudge scene (e.g., nudging on the right side of an object), which may be maintained in separate tables. Referring to FIG. 4B, nudge scene/path table 420 includes a number of entries. Each entry maps a particular set of features 421-425 to a preferred path segment 426. The features include a speed of the ADV 421, a distance between the vehicle and the object 422, a type of the object 423 (e.g., static or moving object), lane width 424, and/or relative position of the object within the lane 425. Distance 422 refers to a distance between a vehicle and an object in front of the vehicle. A relative position of the object within a lane refers to a distance between the center line of the lane and the object. Any one or more of features 421-425 can be utilized for indexing or matching for the purpose of searching and locating an entry that matches a particular set of features of a route segment. For example, speed 421, distance 422, and relative position within the lane 425 can be utilized as a primary searching index or searching features, while object type 423 and/or lane width 424 may be utilized as a secondary searching index or search features.

FIG. 4C shows an example of a lane changing scene/path table according to one embodiment. A lane changing scene refers to a driving scene in which a vehicle attempts to change lane from a source lane to a target lane. Lane changing can include lane changing to the left and lane changing to the right, which may be maintained in separate lane changing scene/path tables. Referring to FIG. 4C, lane changing scene/path table 450 includes a number of entries. Each entry maps a particular set of features 451-454 to a preferred path segment 455. The features include a speed of the ADV 451, lane changing distance 452, current lane width 453, and/or target lane width 454. Lane changing distance 452 refers to a vertical distance within which a vehicle should completely change from the source lane to the target lane. Any one or more of features 451-454 can be utilized for indexing or matching for the purpose of searching and locating an entry that matches a particular set of features of a route segment. For example, speed 451 and a distance between a source lane and a target lane may be utilized as a primary searching index or searching features, while lane changing distance 452 may be utilized as a secondary searching index or searching features. The distance between the source lane and the target lane refers to a distance between the center lines of the source lane and the target lane, which can be derived based on source lane width 453 and target lane width 454.

FIG. 4D shows an example of a stop/parking scene/path table according to one embodiment. A stop/parking scene refers to a driving scene in which a vehicle attempts to stop and park in a particular stop/parking area, which may include stop and park to the left and stop and park to the right maintained by separate stop/parking scene/path tables. Referring to FIG. 4D, stop/parking scene/path table 470 includes a number of entries. Each entry maps a particular set of features 471-473 to a preferred path segment 474. Features include a speed of the ADV 471, lane width 472, and stop/parking area size 473. Any one or more of features 471-473 can be utilized for indexing or matching for the purpose of searching and locating an entry that matches a particular set of features of a route segment. For example, speed 471 and stop/parking area size 453 may be utilized as a primary searching index or searching features, while lane width 452 may be utilized as a secondary searching index or searching feature.

During the real-time driving, according to one embodiment, when an ADV is driving at a particular route segment having characteristics (e.g., shape) matching a particular scene (e.g., straight, turning, nudging, lane changing, stop/parking), a corresponding scene/path table (e.g., turning, nudging, lane changing, stop/parking scene/path tables) is identified. Based on a set of features extracted from the route segment, such as, for example, the speed of the ADV, source lane width, target lane width, and/or turning radius of the route segment, a search is conducted in the corresponding scene/path table to find a mapping entry having the same or similar features. If the matching entry has been found, a preferred path segment is obtained from the matching entry. The preferred path segment can be utilized as a part of a final path without having to calculating the same at real time. As a result, the resources and time for calculating the same path segment can be reduced. However, if there is no matching entry found from the scene/path table, the path segment has to be dynamically calculated at real time. Note that the term of "matching" or "matched" refers to the comparison situation in which values of two items being compared (e.g., speed, lane width, curvature) are within a predetermined threshold corresponding to the type of the compared items.

Note that the indexes for searching purposes can be implemented as a hash function, a predictive model, or a filter, which may be generated using machine learning methods. At real time, the driving parameters at the point in time can be gathered and a hash can be generated using a corresponding hash function. The output of the hash function may be used as an index value pointing to one of the entries in the scene/path table as a matching entry. Referring back to FIG. 1, these scene/path data structures 124 can then be uploaded onto the autonomous driving vehicles and utilized subsequently for generating a path under the similar driving scenes without having to dynamically calculating the same path segments. As a result, the path planning can be performed more efficiently.

Figure 3A:
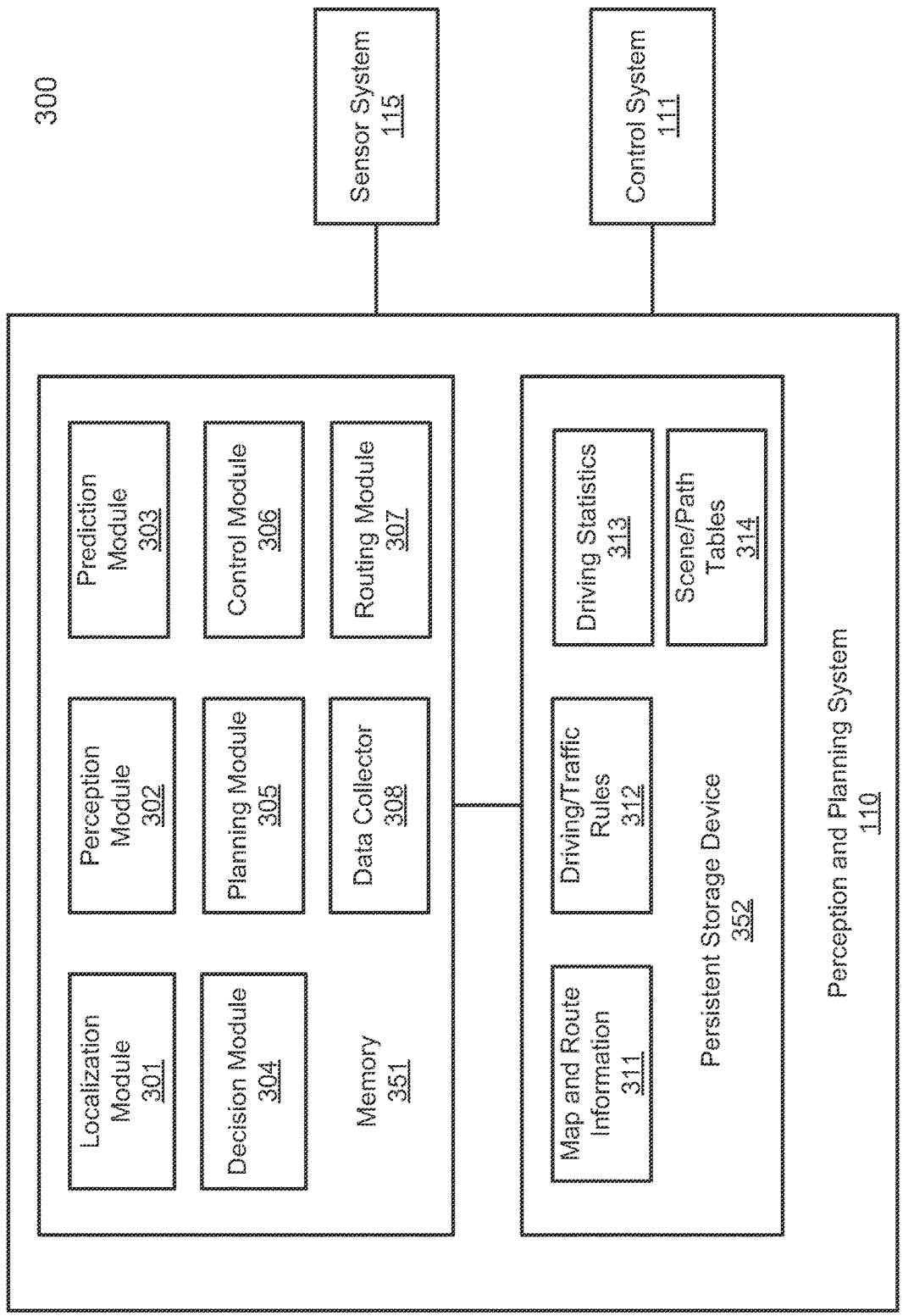
FIGS. 3A-3B are block diagrams illustrating an example of a perception and planning system used with an autonomous vehicle according to one embodiment.
Figure 3B:
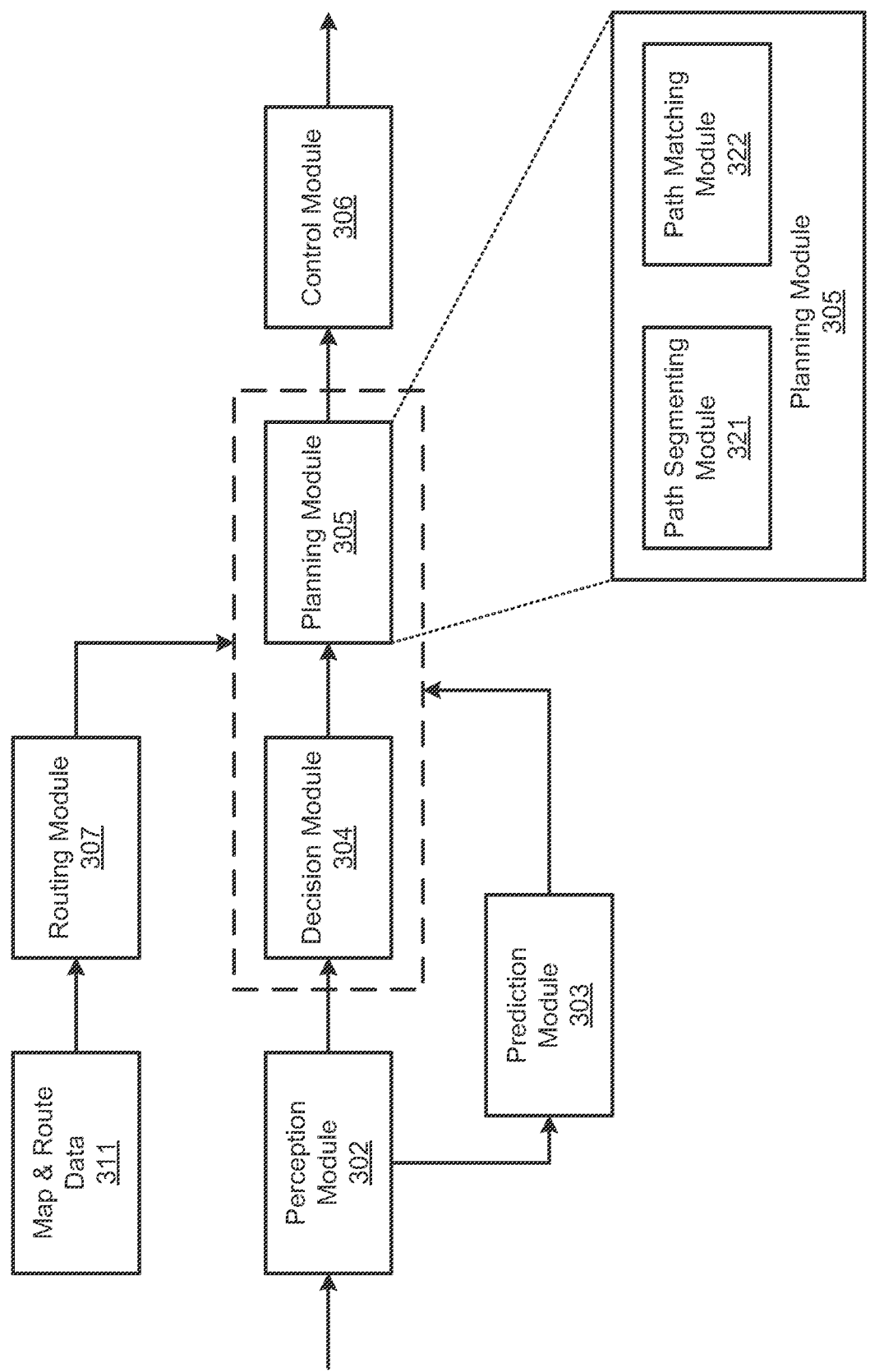

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and data collection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examines all of the possible routes to select one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Data collection module 308 is configured to communicate with other modules and sensors to collect driving statistics 313 during the operations of the ADV. Periodically, driving statistics 313 is then transmitted to a centralized server such as data analytics system 103 for data analysis and mining, for example, to develop scene/path data structures 124 offline using machine learning.

According to one embodiment, planning module 305 includes a path segmenting module 321 and a path matching module 322. In response to a route received from routing module 307, path segmenting module 321 parses and analyzes the route to identify a list of one or more driving scenes along the route that match one or more predefined driving scenes. The route may be represented by a reference line connecting a source location to a target location. Path segmenting module 321 may examine the metadata of the reference line (e.g., shape and length) to identify all possible path segments that have the characteristics of preconfigured preferred path segments. Based on the identified driving scenes, path segmenting module 321 segments the route into a list of one or more route segments, where each route segment corresponds to one of the predefined driving scenes. As described above, a driving scene may be a driving straight scene, a left-turn scene, a right-turn scene, a U-turn scene, a left lane changing scene, a right lane changing scene, a nudge scene, and a stop/parking scene. Other driving scenes may also be applicable. For example, a combo driving scene may be defined based on multiple individual predefined driving scenes above.

In one embodiment, for each of the route segments, path matching module 322 identifies a scene/path table corresponding to a driving scene or type of the route segment. For example, if the route segment is a left-turn route segment, path matching module 322 will identify and retrieve a left-turn scene/path table such as turn scene/path table 400 as shown in FIG. 4A. Once the associated scene/path table has been identified, path matching module 322 searches in the scene/path table based on a set of features extracted from the route segment to locate an entry that matches at least one of the features of the route segment. A preferred path segment is then obtained from the matching entry.

A preferred path segment is utilized as a part of the final path for driving an ADV. For example, a preferred path segment may replace the corresponding route segment provided by routing module 307. As a result, planning module 305 does not have to dynamically calculate the corresponding path segment at the point in time, which may be time and resource consuming. Note that some of the route segments may not have the corresponding preferred path segments found in the associated scene/path table. For example, features of a route segment do not match any of the features in the scene/path table. In such a situation, planning module 305 has to calculate the corresponding path segment dynamically. But for at least the route segments having the matched preferred path segments, the calculation of the corresponding path segments can be avoided to reduce the time and resources consumption during real-time driving.

For the purpose of illustration, referring now to FIG. 5, it is assumed the ADV is about to drive according to a route from point A to point F provided by routing module 307. The route from point A to point F may be represented by a reference line in a form of a topographic map determined based on route and map data services. Based on the metadata or attributes of route A to F, path segmenting module 321 identifies one or more driving scenes along the route. Path segmenting module 321 then segments the route into one or more route segments. In this example, path segmenting module 321 identifies and segments the route A to F into at least the following route segments: 1) route segment from A to B (AB) associated with a straight scene, 2) route segment from B to C (BC) associated with a right lane changing scene, 3) route segment from C to D (CD) associated with a right-turn scene, 4) route segment from D to E (DE) associated with a straight scene, and route segment from E to F (EF) associated with a left lane changing scene.

For each of the route segments (AB, BC, CD, DE, and EF), path matching module 322 identifies a scene/path table corresponding to a driving scene of the route segment. Path matching module 322 then searches in the scene/path table attempting to find a mapping entry that matches at least some of the features of the route segment. If a matching entry is found, a preferred path is obtained from the matching entry, where the preferred path segment will be utilized as a part of the final path for drive the ADV without having to calculate the same at real time.

For example, according to one embodiment, for route segment AB associated with a straight driving scene, path matching module 322 simply obtains a preconfigured straight path segment and scales the preconfigured straight path segment to match the length of route segment AB. A straight scene is also referred to as a scalable scene, where the straight scene can be scaled longer or shorter to fit the actual length of a route segment.

In another example according to another embodiment, referring to FIGS. 4C and 5, for route segment BC associated with a right lane changing scene, path matching module 322 identifies lane changing scene/path table 450 (assuming in this example a right lane changing scene/path table). Path matching module 322 extracts a set of one or more features from route segment BC, such as, for example, the speed of the ADV, lane changing distance, current lane width, and/or target lane width. At least some of the extracted features are utilized to search an entry having a counterpart set of features 451-454 that match the extracted features. Once a matching entry has been found, preferred path segment 455 can be obtained from the matching entry. The preferred path segment 455 can be utilized as a path segment of the final path, for example, by replacing the corresponding route segment BC, without having to calculating the same dynamically at the point in time.

In a further example according to yet another embodiment, referring to FIGS. 4A and 5, for route segment CD associated with a right turn scene, path matching module 322 identifies turn scene/path table 400 (assuming in this example a right lane changing scene/path table). Path matching module 322 extracts a set of one or more features from route segment CD, such as, for example, the speed of the ADV, source lane width, target lane width, and/or turning radius or curvature. At least some of the extracted features are utilized to search an entry having a counterpart set of features 401-404 that match the extracted features. Once a matching entry has been found, preferred path segment 405 can be obtained from the matching entry. The preferred path segment 405 can be utilized as a path segment of the final path, for example, by replacing the corresponding route segment CD, without having to calculating the same dynamically at the point in time.

Figure 6:
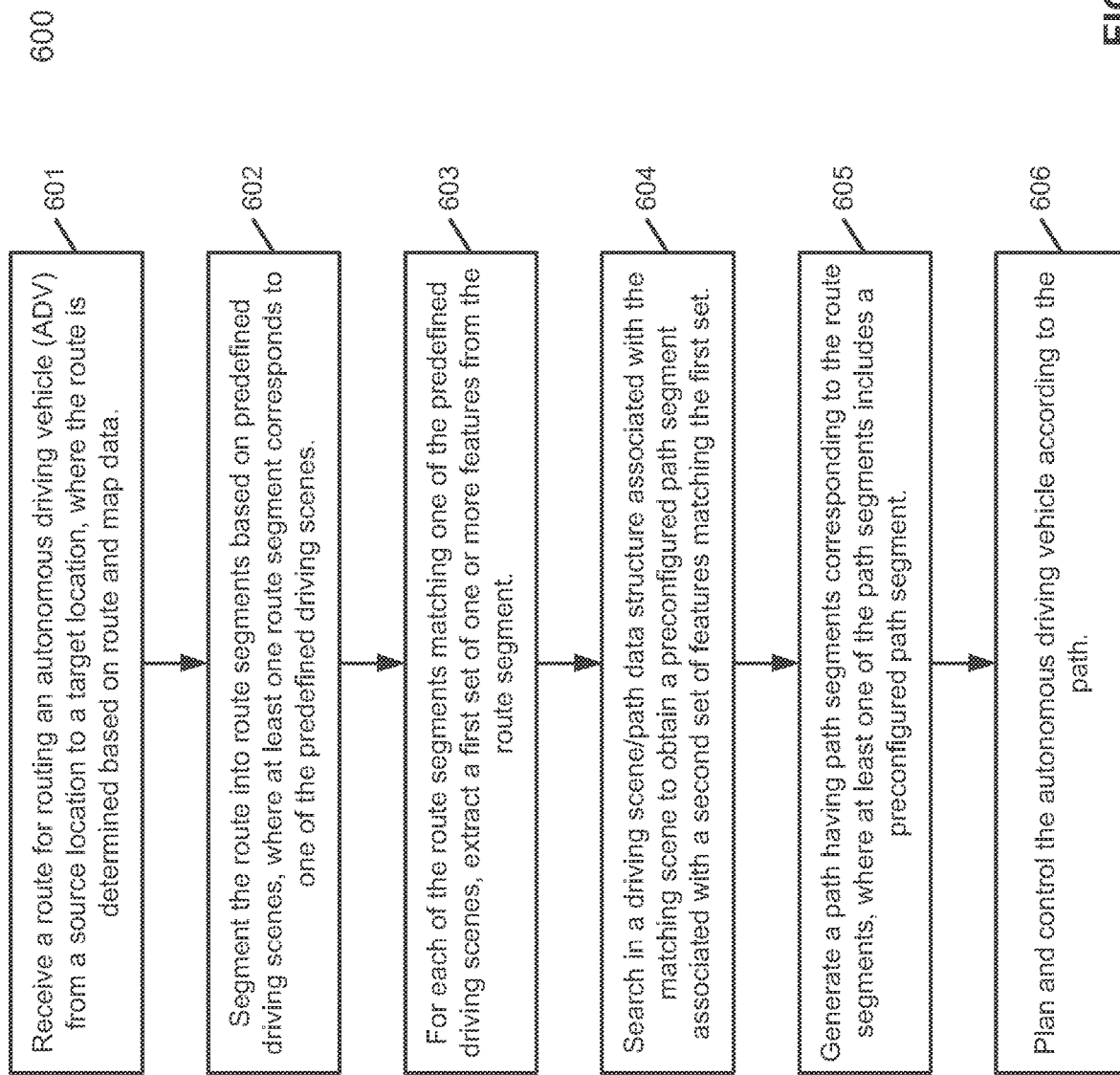
FIG. 6 is a flow diagram illustrating a process of generating a path for routing an autonomous driving vehicle according to one embodiment.

FIG. 6 is a flow diagram illustrating a process of determining a path for driving an autonomous driving vehicle according to one embodiment. Process 600 may be performed by processing logic which may include software, hardware, or a combination thereof. For example, process 600 may be performed by system 300 of FIGS. 3A and 3B. Referring to FIG. 6, in operation 601, processing logic receives a route for routing an ADV from a source location to a target location, which is generated based on route and map data. In operation 602, processing logic segments the route into route segments based on a set of one or more driving scenes, where at least one of the route segments corresponds to one of the predetermined driving scenes. In operation 603, for each of the route segments, processing logic extracts a first set of features from the route segment, such as, for example, speed of the vehicle, lane width, curvature of the route segment, etc.

In operation 604, processing logic searches in a driving scene/path data structure associated with the matching scene to obtain a preconfigured path segment associated with a second set of features matching the first set. In operation 605, processing logic generates a path having a number of path segments corresponding to the route segments. At least one of the path segments is determined based on a preconfigured path segment (e.g., preferred or recommended path segment) of a predefined driving scene, without having to calculating the same path segment dynamically at the point in time. In operation 606, processing logic plans and controls an autonomous driving vehicle according to the path.

Figure 7:
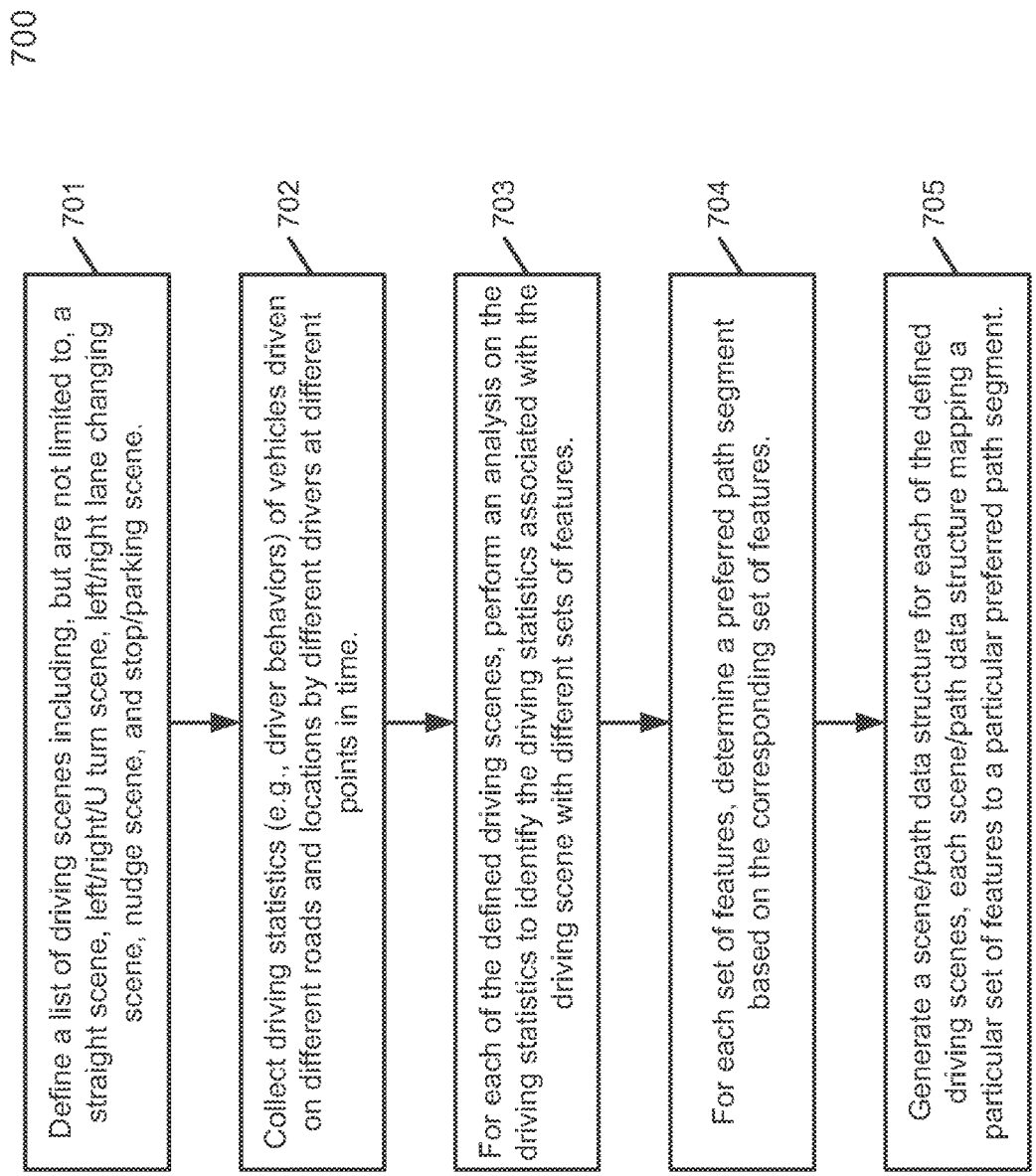
FIG. 7 is a flow diagram illustrating a process of creating driving scene to path mapping data structures according to one embodiment.

FIG. 7 is a flow diagram illustrating a process of generating scene to path mapping data structures according to one embodiment. Process 700 may be performed by processing logic which may include software, hardware, or a combination thereof. For example, process 700 may be performed by data analytics system 103 of FIG. 1. Referring to FIG. 7, in operation 701, processing logic defines a list of driving scenes including, but are not limited to, a straight scene, left/right/U turn scene, left/right lane changing scene, nudge scene, and stop/parking scene. In operation 702, processing logic collects driving statistics (e.g., driving behaviors) of a large amount of vehicles driven a variety of different drivers on different roads and locations at different points in time. For each of the defined driving scenes, in operation 703, processing logic performs an analysis on the driving statistics to identify the driving statistics or driving behaviors associated with the driving scene with different sets of features. For each set of features, in operation 704, processing logic determines a preferred path segment based on the corresponding set of features. In operation 705, processing logic generates a scene/path data structure for each of the defined driving scenes to map a particular set of features to a preferred path segment that is determined based on the driving statistics or driving behaviors of different drivers under the same or similar driving scene.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
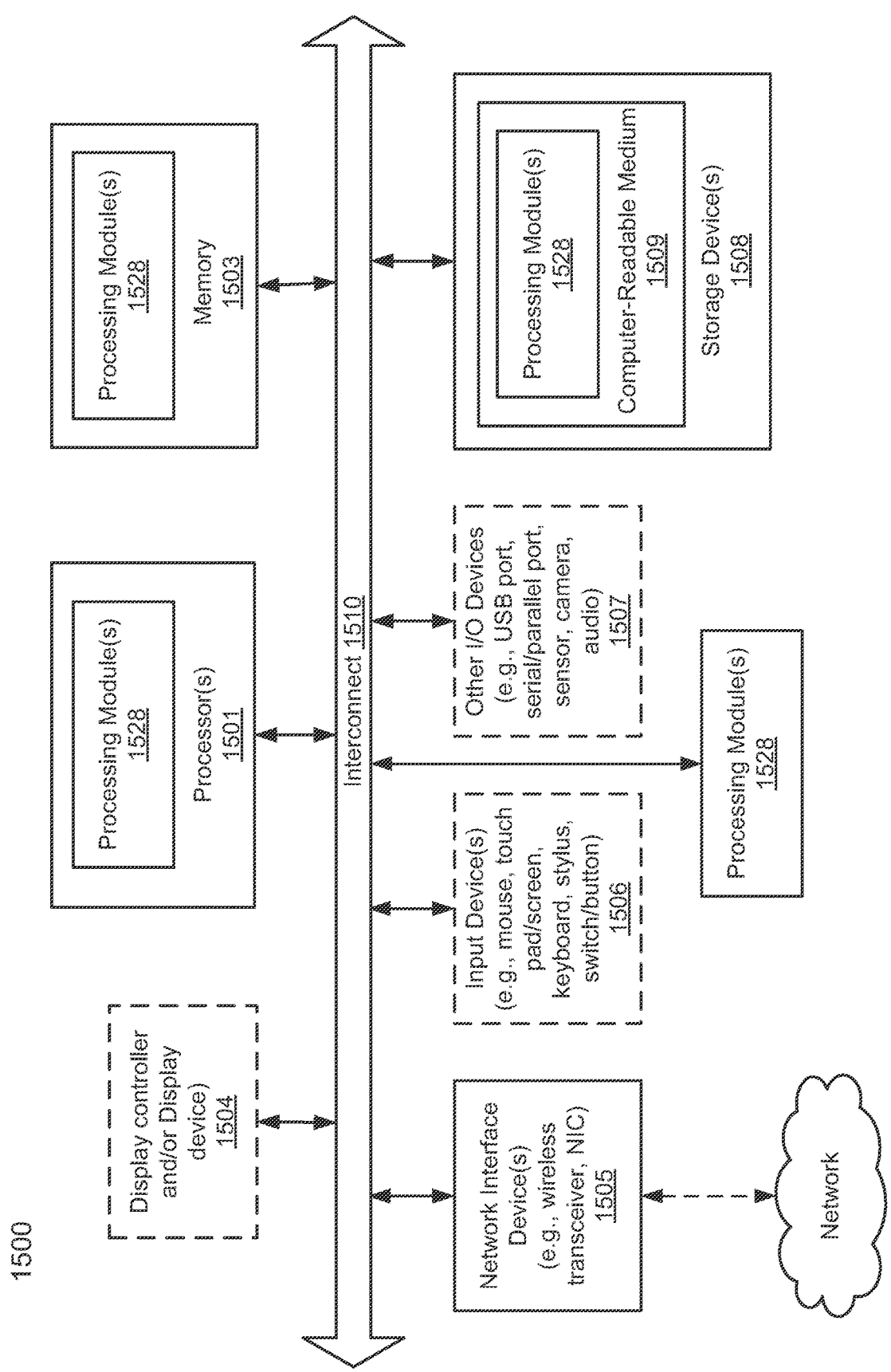
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or routing module 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for path planning of autonomous driving vehicles, the method comprising:
in response to a route for routing an autonomous driving vehicle (ADV) from a source location to a target location, segmenting the route into a plurality of route segments based on a plurality of predefined driving scenes, wherein the plurality of predefined driving scenes comprises two of a driving straight scene, a turning scene, a nudging scene, a stop/parking scene, and a lane changing scene, wherein each route segment corresponds to one of the predefined driving scenes;
identifying one or more of the plurality route segments that match any of the predefined driving scenes, wherein the match is determined when a value associated with the one or more of the plurality route segments and any of the predefined driving scene being compared is within a predetermined threshold;
for each of the route segments matching any one of the predefined driving scenes,
extracting a first set of one or more features from the route segment, and
searching in a driving scene to path (scene/path) data structure associated with the matching driving scene based on the first set of features to obtain a preconfigured path segment having a second set of features that match the first set of features, and, for each of the route segments not matching any one of the features associated with the preconfigured path segment of the same driving scene, calculating a corresponding path segment of the path; and
generating a path based on the route segments, the path having a plurality of path segments corresponding to the route segments, wherein at least one of the path segments of the path is determined based on the preconfigured path segment corresponding to one of the predefined driving scenes.

2. The method of claim 1, wherein the driving scene/path data structure is one of a plurality of driving scene/path tables, wherein each driving scene/path table corresponds to one of a plurality of predefined driving scenes, and wherein each driving scene/path table comprises a plurality of mapping entries, each mapping entry mapping a particular set of features to a particular preconfigured path.

3. The method of claim 1, wherein generating the path based on the route segments comprises:
for each of the route segments of the route matching one of the predefined driving scenes, identifying a preconfigured path segment based on the first set of features associated with the route segment; and
replacing a corresponding path segment of the path with the corresponding preconfigured path segment without having to dynamically calculating the corresponding path segment.

4. The method of claim 1, further comprising:
determining that a first driving scene associated with a first route segment is a turning scene;
determining a speed of the ADV and a curvature of the first route segment associated with the first route segment; and
obtaining a first preconfigured path segment from a turning scene/path table based on the speed and the curvature, wherein the first preconfigured path segment is to replace a first path segment of the path corresponding to the first route segment.

5. The method of claim 1, further comprising:
determining that a first driving scene associated with a first route segment is a nudge scene to nudge an obstacle in front of the ADV;
determining a speed of the ADV, a distance between the ADV and the obstacle, and a relative position of the obstacle within a road associated with the first route segment; and
obtaining a first preconfigured path segment from a turning scene/path table based on the speed of the ADV, the distance between the ADV and the obstacle, and the relative position of the obstacle within the road, wherein the first preconfigured path segment is to replace a first path segment of the path corresponding to the first route segment.

6. The method of claim 1, further comprising:
determining that a first driving scene associated with a first route segment is a lane changing scene from a source lane to a target lane;
determining a speed of the ADV and a distance between the source lane and the target lane associated with the first route segment; and
obtaining a first preconfigured path segment from a turning scene/path table based on the speed of the ADV and the distance between the source lane and the target lane, wherein the first preconfigured path segment is to replace a first path segment of the path corresponding to the first route segment.

7. The method of claim 1, further comprising:
determining that a first driving scene associated with a first route segment is a stop/parking scene to stop or park the ADV in a stop/parking area;
determining a speed of the ADV and a size of the stop/parking area associated with the first route segment; and
obtaining a first preconfigured path segment from a turning scene/path table based on the speed of the ADV and the size of the stop/parking area, wherein the first preconfigured path segment is to replace a first path segment of the path corresponding to the first route segment.

8. A non-transitory machine-readable medium having instructions stored therein, which when executed by a processor, cause the processor to perform operations, the operations comprising:
in response to a route for routing an autonomous driving vehicle (ADV) from a source location to a target location, segmenting the route into a plurality of route segments based on a plurality of predefined driving scenes, wherein the plurality of predefined driving scenes comprises two of a driving straight scene, a turning scene, a nudging scene, a stop/parking scene, and a lane changing scene, wherein each route segment corresponds to one of the predefined driving scenes;
identifying one or more of the plurality route segments that match any of the predefined driving scenes, wherein the match is determined when a value associated with the one or more of the plurality route segments and any of the predefined driving scene being compared is within a predetermined threshold;

for each of the route segments matching any one of the predefined driving scenes, extracting a first set of one or more features from the route segment, and searching in a driving scene to path (scene/path) data structure associated with the matching driving scene based on the first set of features to obtain a preconfigured path segment having a second set of features that match the first set of features, and, for each of the route segments not matching any one of the features associated with the preconfigured path segment of the same driving scene, calculating a corresponding path segment of the path; and generating a path based on the route segments, the path having a plurality of path segments corresponding to the route segments, wherein at least one of the path segments of the path is determined based on the preconfigured path segment corresponding to one of the predefined driving scenes.

9. The machine-readable medium of claim 8, wherein the operations further comprise:

determining that a first driving scene associated with a first route segment is a stop/parking scene to stop or park the ADV in a stop/parking area;

determining a speed of the ADV and a size of the stop/parking area associated with the first route segment; and obtaining a first preconfigured path segment from a turning scene/path table based on the speed of the ADV and the size of the stop/parking area, wherein the first preconfigured path segment is to replace a first path segment of the path corresponding to the first route segment.

10. The machine-readable medium of claim 8, wherein the operations further comprise:

determining that a first driving scene associated with a first route segment is a lane changing scene from a source lane to a target lane;

determining a speed of the ADV and a distance between the source lane and the target lane associated with the first route segment; and obtaining a first preconfigured path segment from a turning scene/path table based on the speed of the ADV and the distance between the source lane and the target lane, wherein the first preconfigured path segment is to replace a first path segment of the path corresponding to the first route segment.

11. The machine-readable medium of claim 8, wherein generating the path based on the route segments comprises:

for each of the route segments of the route matching one of the predefined driving scenes, identifying a preconfigured path segment based on the first set of features associated with the route segment; and replacing a corresponding path segment of the path with the corresponding preconfigured path segment without having to dynamically calculating the corresponding path segment.

12. The machine-readable medium of claim 8, wherein the operations further comprise:

determining that a first driving scene associated with a first route segment is a turning scene;

determining a speed of the ADV and a curvature of the first route segment associated with the first route segment; and obtaining a first preconfigured path segment from a turning scene/path table based on the speed and the curvature, wherein the first preconfigured path segment is to replace a first path segment of the path corresponding to the first route segment.

13. The machine-readable medium of claim 8, wherein the operations further comprise:

determining that a first driving scene associated with a first route segment is a nudge scene to nudge an obstacle in front of the ADV;

determining a speed of the ADV, a distance between the ADV and the obstacle, and a relative position of the obstacle within a road associated with the first route segment; and obtaining a first preconfigured path segment from a turning scene/path table based on the speed of the ADV, the distance between the ADV and the obstacle, and the relative position of the obstacle within the road, wherein the first preconfigured path segment is to replace a first path segment of the path corresponding to the first route segment.

14. A data processing system, comprising:

a processor; and a memory coupled to the processor to store instructions, which when executed by the processor, cause the processor to perform operations, the operations including in response to a route for routing an autonomous driving vehicle (ADV) from a source location to a target location, segmenting the route into a plurality of route segments based on a plurality of predefined driving scenes, wherein the plurality of predefined driving scenes comprises two of a driving straight scene, a turning scene, a nudging scene, a stop/parking scene, and a lane changing scene, wherein each route segment corresponds to one of the predefined driving scenes, identifying one or more of the plurality route segments that match any of the predefined driving scenes, wherein the match is determined when a value associated with the one or more of the plurality route segments and any of the predefined driving scene being compared is within a predetermined threshold, for each of the route segments matching any one of the predefined driving scenes, extracting a first set of one or more features from the route segment, and searching in a driving scene to path (scene/path) data structure associated with the matching driving scene based on the first set of features to obtain a preconfigured path segment having a second set of features that match the first set of features, and, for each of the route segments not matching any one of the features associated with the preconfigured path segment of the same driving scene, calculating a corresponding path segment of the path, and generating a path based on the route segments, the path having a plurality of path segments corresponding to the route segments, wherein at least one of the path segments of the path is determined based on the preconfigured path segment corresponding to one of the predefined driving scenes.

15. The system of claim 14, wherein the operations further comprise:

determining that a first driving scene associated with a first route segment is a stop/parking scene to stop or park the ADV in a stop/parking area;

determining a speed of the ADV and a size of the stop/parking area associated with the first route segment; and obtaining a first preconfigured path segment from a turning scene/path table based on the speed of the ADV and the size of the stop/parking area, wherein the first preconfigured path segment is to replace a first path segment of the path corresponding to the first route segment.

16. The system of claim 14, wherein the operations further comprise:

determining that a first driving scene associated with a first route segment is a lane changing scene from a source lane to a target lane;

determining a speed of the ADV and a distance between the source lane and the target lane associated with the first route segment; and obtaining a first preconfigured path segment from a turning scene/path table based on the speed of the ADV and the distance between the source lane and the target lane, wherein the first preconfigured path segment is to replace a first path segment of the path corresponding to the first route segment.

17. The system of claim 14, wherein the operations further comprise:

determining that a first driving scene associated with a first route segment is a nudge scene to nudge an obstacle in front of the ADV;

determining a speed of the ADV, a distance between the ADV and the obstacle, and a relative position of the obstacle within a road associated with the first route segment; and obtaining a first preconfigured path segment from a turning scene/path table based on the speed of the ADV, the distance between the ADV and the obstacle, and the relative position of the obstacle within the road, wherein the first preconfigured path segment is to replace a first path segment of the path corresponding to the first route segment.

18. The system of claim 14, wherein generating the path based on the route segments comprises:

for each of the route segments of the route matching one of the predefined driving scenes, identifying a preconfigured path segment based on the first set of features associated with the route segment; and replacing a corresponding path segment of the path with the corresponding preconfigured path segment without having to dynamically calculating the corresponding path segment.

19. The system of claim 14, wherein the operations further comprise:

determining that a first driving scene associated with a first route segment is a turning scene;

determining a speed of the ADV and a curvature of the first route segment associated with the first route segment; and obtaining a first preconfigured path segment from a turning scene/path table based on the speed and the curvature, wherein the first preconfigured path segment is to replace a first path segment of the path corresponding to the first route segment.

* * * * *